United States Patent
Wang et al.

(10) Patent No.: US 12,065,452 B2
(45) Date of Patent: Aug. 20, 2024

(54) PREPARATION METHOD AND USE OF GRAPHITE FELT (GF)-SUPPORTED METAL-ORGANIC FRAMEWORK (MOF) CATHODE MATERIAL

(71) Applicant: Tongji University, Shanghai (CN)

(72) Inventors: Ying Wang, Shanghai (CN); Fengting Li, Shanghai (CN); Bincheng Xu, Shanghai (CN)

(73) Assignee: TONGJI UNIVERSITY, Shanghai (CN)

(*) Notice: Subject to any disclaimer, the term of this patent is extended or adjusted under 35 U.S.C. 154(b) by 742 days.

(21) Appl. No.: 17/204,953

(22) Filed: Mar. 18, 2021

(65) Prior Publication Data
US 2021/0309681 A1  Oct. 7, 2021

(30) Foreign Application Priority Data
Apr. 1, 2020 (CN) .......................... 202010248988.9

(51) Int. Cl.
| | |
|---|---|
| C07F 15/00 | (2006.01) |
| C01B 32/21 | (2017.01) |
| C02F 1/461 | (2023.01) |
| C02F 1/467 | (2023.01) |
| C07F 15/02 | (2006.01) |
| C02F 101/30 | (2006.01) |

(52) U.S. Cl.
CPC .............. *C07F 15/02* (2013.01); *C01B 32/21* (2017.08); *C02F 1/46109* (2013.01); *C02F 1/4672* (2013.01); *C02F 2001/46142* (2013.01); *C02F 2101/30* (2013.01); *C02F 2305/026* (2013.01)

(58) Field of Classification Search
CPC ..... C01B 32/20; C01B 32/21; C02F 1/46109; C02F 1/46138; C02F 1/46142
USPC ........................................... 427/226
See application file for complete search history.

(56) References Cited

U.S. PATENT DOCUMENTS

| | | | |
|---|---|---|---|
| 2008/0214806 A1* | 9/2008 | Schubert .............. | B01J 31/1691 205/426 |
| 2009/0171107 A1* | 7/2009 | Putter ....................... | C25B 3/13 556/112 |
| 2018/0226682 A1* | 8/2018 | Lu ...................... | H01M 10/0525 |
| 2021/0066719 A1* | 3/2021 | Kim ........................ | H01M 4/38 |
| 2021/0218024 A1* | 7/2021 | Song ................. | H01M 10/0525 |

* cited by examiner

*Primary Examiner* — Brian K Talbot
(74) *Attorney, Agent, or Firm* — Bayramoglu Law Offices LLC

(57) ABSTRACT

A preparation method and use of a graphite felt (GF)-supported metal-organic framework (MOF) cathode material is disclosed. The preparation method includes the following steps:

preparing an iron salt, Pluronic F127, a weak acid, 2-aminoterephthalic acid, and a carbon felt; adding the iron salt and Pluronic F127 to deionized water and stirring a resulting mixture; adding the weak acid and 2-aminoterephthalic acid to the mixture, and stirring a resulting mixture to obtain an MOF precursor solution; adding the MOF precursor solution together with a pretreated carbon felt to a reactor, and sealing the reactor for hydrothermal reaction; and washing and vacuum drying a reaction product to obtain the cathode material. With a porous structure and a large specific surface area (SSA), the cathode material significantly increases the output of $H_2O_2$ when used in an electric Fenton system.

7 Claims, 2 Drawing Sheets

PREPARATION METHOD AND USE OF GRAPHITE FELT (GF)-SUPPORTED METAL-ORGANIC FRAMEWORK (MOF) CATHODE MATERIAL

CROSS REFERENCE TO THE RELATED APPLICATIONS

This application is based upon and claims priority to Chinese Patent Application No. 202010248988.9, filed on Apr. 1, 2020, the entire contents of which are incorporated herein by reference.

TECHNICAL FIELD

The present invention belongs to the technical field of chemical materials, and in particular relates to a preparation method and use of a graphite felt (GF)-supported metal-organic framework (MOF) cathode material.

BACKGROUND

Advanced oxidation processes (AOPs) have received widespread attention as they can achieve highly-efficient degradation of toxic and/or persistent organic pollutants (POPs) in water. The Fenton method is the most widely used AOP. However, a traditional Fenton process requires a large amount of Fenton's reagent ($H_2O_2$ and $Fe^{2+}$), is applicable to a narrow pH range, and produces a large amount of iron-containing sludge. The electro-Fenton process (EFP) is a new and clean electrochemical AOP. Compared with the traditional Fenton process, in the EFP, $H_2O_2$ is generated through two-electron reduction of dissolved oxygen in water at a cathode to avoid the danger in storage and long-distance transportation of $H_2O_2$; and $Fe^{3+}$ can be reduced to $Fe^{2+}$ at the cathode, thus decreasing the feeding amount of $Fe^{2+}$ and the output of iron-containing sludge. However, in homogeneous EFP, $Fe^{2+}$ still needs to be added at a concentration as high as 0.01 M and an applicable pH range is narrow. Therefore, many scholars have studied the heterogeneous Fenton process. However, in a heterogeneous Fenton process in the prior art, GF is generally used as a cathode material, which cannot reduce a required amount of $H_2O_2$ in the Fenton's reagent and will results in a large amount of iron-based sludge, a low degradation rate, and a narrow applicable pH range.

SUMMARY

The present invention is intended to provide a GF-supported MOF cathode material and use of the cathode material in an electro-Fenton system for degrading pollutants in water. The cathode material serves as a heterogeneous Fenton catalyst to realize the activation of $H_2O_2$ to produce ·OH and can also improve the oxygen reduction activity of an electrode interface, thereby significantly increasing the output of $H_2O_2$. The cathode material, when used in the electro-Fenton system, can realize a high degradation rate, a wide applicable pH range, and prominent chemical stability. Moreover, the present invention can achieve the following excellent technical effects: almost no metal ions are precipitated in degradation of pollutants under acidic conditions, the degradation performance can still maintain stability after repeated use, and almost no iron-based sludge is produced.

In order to achieve the above object, the present invention provides the following technical solutions: a preparation method of a GF-supported MOF cathode material is provided, including the following steps:

1) preparing a specified amount of each of an iron salt, 2-aminoterephthalic acid, Pluronic F127, a weak acid, and a carbon felt; adding the iron salt and Pluronic F127 to deionized water and stirring a resulting mixture for 1 h to 2 h to obtain a mixed solution; where, the iron salt, 2-aminoterephthalic acid, deionized water, Pluronic F127, and weak acid have a molar ratio of 1:(0.25-1):(1,000-2,000):(0.01-0.16):(1-16);
2) adding the weak acid and 2-aminoterephthalic acid to the mixed solution obtained in step 1) and stirring a resulting mixture for 2 h to 4 h to obtain an MOF precursor solution;
3) adding the MOF precursor solution obtained in the step 2) together with a pretreated carbon felt to a reactor, and sealing the reactor for hydrothermal reaction; and after the reaction is completed, naturally cooling the reactor to room temperature; and
4) washing and vacuum drying a reaction product in the reactor to obtain the GF-supported MOF cathode material.

Further, in step 3), a pretreatment method for the carbon felt may include ultrasonic cleaning with acetone or ethanol for 0.5 h to 1 h; and washing with ultrapure water (UPW) until there is no acetone or ethanol residue.

Further, the iron salt may be one or more of ferric chloride, ferric nitrate, and ferric sulfate.

Further, the weak acid may be one or more of acetic acid and formic acid.

Further, in step 3), the hydrothermal reaction may be conducted at a constant temperature of 100° C. to 130° C. for 24 h to 48 h.

Further, in step 4), the washing may be conducted with UPW at room temperature for 0.5 h to 1 h and then with ethanol at 50° ° C. to 70° C. for 0.5 h to 1 h.

Further, in step 4), the vacuum drying may be conducted at 45° ° C. to 65° C. for 10 h to 24 h.

The present invention also provides use of the GF-supported MOF cathode material described above in an electro-Fenton system for degrading organic pollutants in water.

Further, the electro-Fenton reaction may be conducted at a temperature of 20° ° C. to 30° C. and a pH of 3 to 9.

Compared with the prior art, the present invention has the following beneficial effects:

1. In the present invention, an MOF is loaded on a pretreated carbon felt by a one-step hydrothermal method to obtain a cathode material. The MOF serves as a heterogeneous Fenton catalyst to realize the activation of $H_2O_2$ to produce OH and also can improve the oxygen reduction activity of an electrode interface, thereby significantly increasing the output of $H_2O_2$.
2. Compared with existing electro-Fenton cathode materials, the GF-supported MOF cathode material synthesized in the present invention has a wide applicable pH range and excellent chemical stability, almost results in no precipitation of metal ions during the degradation of pollutants under acidic conditions, and still exhibits stable degradation performance after repeated use.
3. The preparation process of the present invention is simple and requires controllable reaction conditions, easily-available raw materials, and low cost. A prepared GF-supported MOF cathode material has excellent catalytic degradation performance, can achieve highly-efficient degradation of POPs, and has promising industrial application prospects.

4. The cathode material prepared by a simple method has a porous structure and a large specific surface area (SSA). The MOF supported by the GF provides abundant active sites for two-electron reduction of $O_2$ to generate $H_2O_2$ and the activation of $H_2O_2$ to generate ·OH. The cathode material significantly increases the output of $H_2O_2$ when used in an electro-Fenton system and significantly improves the removal rate of acid red when used in the degradation of organic pollutants in water. A reaction process requires no oxygen, aeration, or Fenton's reagent and has a wide applicable pH range and strong acid stability. Therefore, the present invention effectively overcomes the shortcomings in traditional Fenton reaction, such as a need of Fenton's reagent, a narrow applicable pH range, and a high iron sludge output, and has promising application prospects in the field of water treatment.

DETAILED DESCRIPTION OF THE EMBODIMENTS

The technical solutions in the examples of the present invention are clearly and completely described below with reference to the accompanying drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

Example 1

This example provided a preparation method of the GF-supported MOF cathode material, including the following steps: 179 mg of $FeCl_3·6H_2O$ and 160 mg of Pluronic F127 were dissolved in 15 mL of deionized water, and a resulting mixture was stirred for 1 h to obtain a mixed solution; 0.3 mL of $CH_3COOH$ and 60 mg of 2-aminoterephthalic acid were added to the mixed solution, and a resulting mixture was stirred for 4 h to obtain an MOF precursor solution, a commercial GF with a thickness of 0.5 cm was cut to have a size of 3 cm×2 cm, then immersed in acetone and subjected to ultrasonic cleaning for 0.5 h to remove oil stains, and thoroughly rinsed with UPW to obtain a clean GF; the MOF precursor solution and the GF were added to a reactor together, then the reactor was sealed, and hydrothermal reaction was conducted at 110° C. for 24 h; after the reaction was completed, the reactor was naturally cooled to room temperature, and a product was washed with UPW at room temperature for 0.5 h and then with ethanol at 60° C. for 0.5 h to remove impurities; and a resulting product was vacuum dried at 60° C. for 10 h to obtain the GF-supported MOF cathode material (MOFs@GF).

Figure 1:
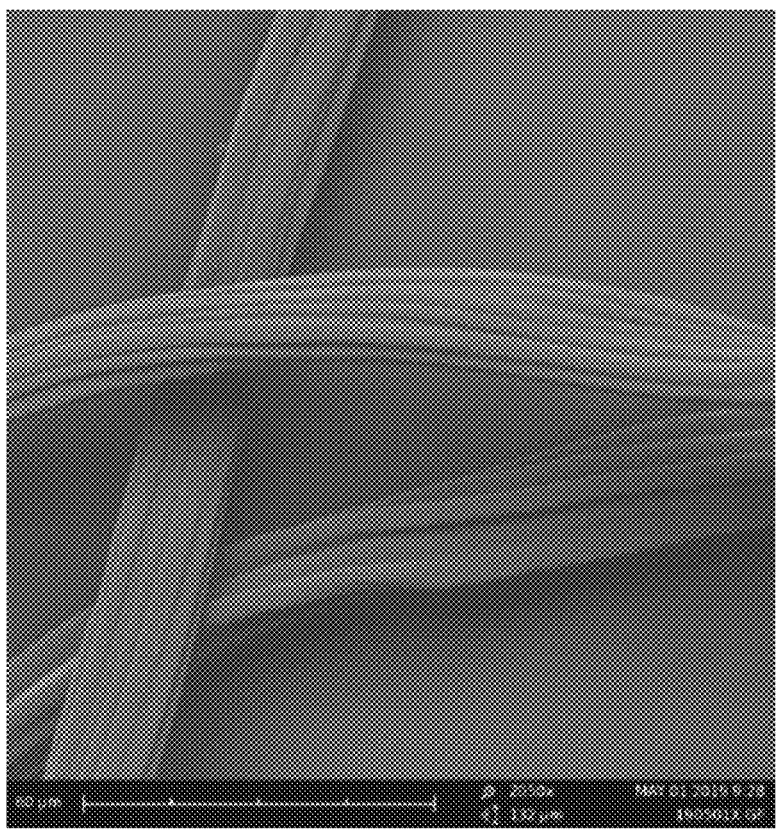
FIG. 1 is a scanning electron microscope (SEM) image of the GF used in Example 1 of the present invention.
Figure 2:
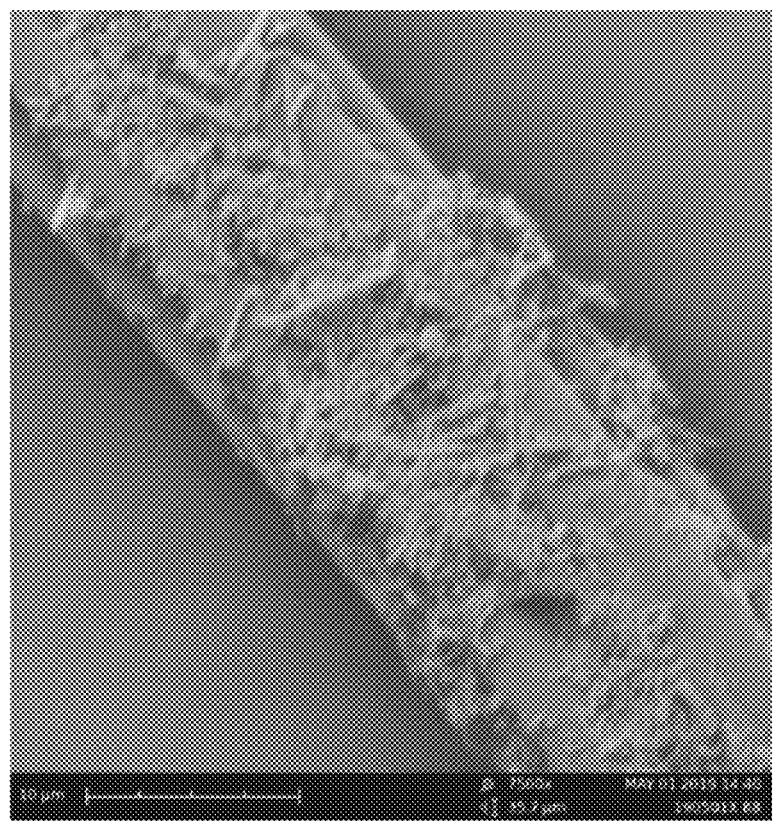
FIG. 2 is an SEM image of the GF-supported MOF cathode material prepared in Example 1 of the present invention.

An SEM image of the GF-supported MOF cathode material (MOFs@GF) provided in this example is shown in FIG. 2. It can be seen from the figure that MOFs are densely loaded on the surface of the GF, which provide abundant active sites for two-electron reduction of 02 to generate $H_2O_2$ and the activation of $H_2O_2$ to generate ·OH.

Figure 3:
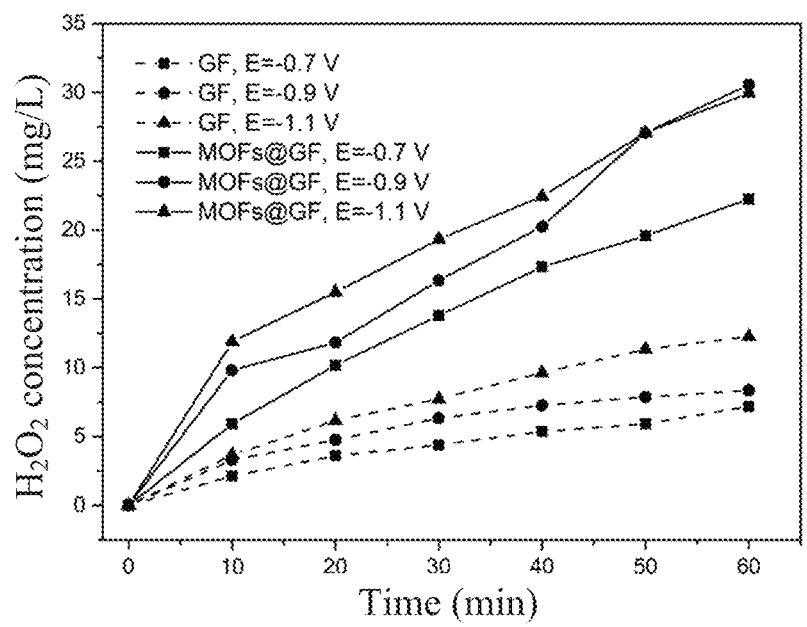
FIG. 3 shows the hydrogen peroxide production effects of the GF and the GF-supported MOF cathode material prepared therefrom in Example 1 of the present invention.

This example also provided use of the GF-supported MOF cathode material (MOFs@GF) prepared above in an electro-Fenton system for degrading organic pollutants in water. In the electro-Fenton system of this example, the GF-supported MOF cathode material (MOFs@GF) prepared above was used as a cathode, a gauze platinum electrode was used as an anode, and a 0.05 M $Na_2SO_4$ solution was used as an electrolyte. As shown in FIG. 3, in the electro-Fenton system, after organic matters in water are degraded for 1 h, the GF-supported MOF cathode material (MOFs@GF) can achieve an $H_2O_2$ output more than three times that of the GF.

Figure 4:
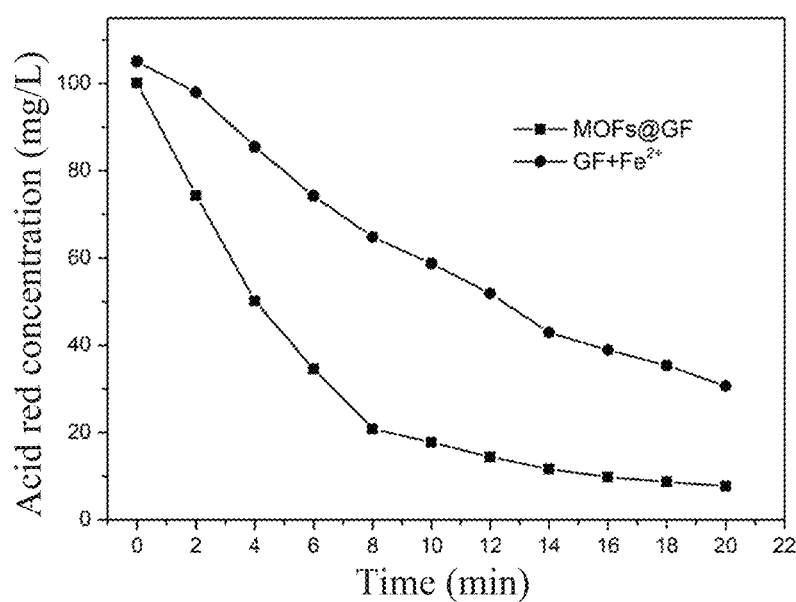
FIG. 4 shows the effects of the GF and the GF-supported MOF cathode material prepared therefrom in Example 1 of the present invention in an electro-Fenton system for degrading acid red.

As shown in FIG. 4, a comparative example for the use of the GF-supported MOF cathode material (MOFs@GF) in an electro-Fenton system for degrading organic pollutants in water in this example was provided as follows: an electro-Fenton system was established with GF as an cathode, a gauze platinum electrode as an anode, and a 0.2 mM $Fe^{2+}$ solution as an electrolyte to treat organic pollutants in water from the same source. It can be seen from FIG. 4 that the GF-supported MOF cathode material (MOFs@GF) prepared in this example exhibits a treatment effect significantly superior to that of GF.

Example 2

This example provided a preparation method of the GF-supported MOF cathode material, including the following steps: 179 mg of $Fe(NO_3)_3·9H_2O$ and 160 mg of Pluronic F127 were dissolved in 15 mL of deionized water, and a resulting mixture was stirred for 1.5 h to obtain a mixed solution; 0.15 mL of formic acid and 60 mg of 2-aminoterephthalic acid were added to the mixed solution, and a resulting mixture was stirred for 2 h to obtain an MOF precursor solution; a commercial GF with a thickness of 0.5 cm was cut to have a size of 3 cm×2 cm, then immersed in acetone and subjected to ultrasonic cleaning for 0.75 h to remove oil stains, and thoroughly rinsed with UPW to obtain a clean GF; the MOF precursor solution and the GF were added to a reactor together, then the reactor was sealed, and hydrothermal reaction was conducted at 100° ° C. for 36 h; after the reaction was completed, the reactor was naturally cooled to room temperature, and a product was washed with UPW at room temperature for 0.75 h and then with ethanol at 50° C. for 0.75 h to remove impurities; and a resulting product was vacuum dried at 45° C. for 17 h to obtain the GF-supported MOF cathode material (MOFs@GF).

Example 3

This example provided a preparation method of the GF-supported MOF cathode material, including the following steps: 179 mg of $Fe_2(SO_4)_3·9H_2O$ and 320 mg of Pluronic F127 were dissolved in 15 mL of deionized water, and a resulting mixture was stirred for 2 h to obtain a mixed solution; 0.30 mL of formic acid and 60 mg of 2-aminoterephthalic acid were added to the mixed solution, and a resulting mixture was stirred for 3 h to obtain an MOF precursor solution; a commercial GF with a thickness of 0.5 cm was cut to have a size of 3 cm×2 cm, then immersed in acetone and subjected to ultrasonic cleaning for 1 h to remove oil stains, and thoroughly rinsed with UPW to obtain a clean GF; the MOF precursor solution and the GF were added to a reactor together, then the reactor was sealed, and hydrothermal reaction was conducted at 130° ° C. for 48 h; after the reaction was completed, the reactor was naturally cooled to room temperature, and a product was washed with UPW at room temperature for 1 h and then with ethanol at 70° C. for 1 h to remove impurities; and a resulting product was vacuum dried at 65° C. for 24 h to obtain the GF-supported MOF cathode material (MOFs@GF).

The examples are described above to facilitate the comprehension and use of the present invention by those of ordinary skill in the art. Obviously, a person skilled in the art can easily make various modifications to these examples, and apply a general principle described herein to other examples without creative efforts. Therefore, the present invention is not limited to the aforementioned examples. All improvements and modifications made by those skilled in the art according to the principle of the present invention without departing from the scope of the present invention should fall within the protection scope of the present invention.

What is claimed is:

1. A preparation method of a graphite felt (GF)-supported metal-organic framework (MOF) cathode material, comprising the following steps:
   1) Preparing a predetermined amount of each of an iron salt, 2-aminoterephthalic acid, Pluronic F127, a weak acid, and a carbon felt; adding the iron salt and the Pluronic F127 to deionized water to obtain a first resulting mixture and stirring the first resulting mixture for 1 h to 2 h to obtain a mixed solution, wherein, the iron salt, the 2-aminoterephthalic acid, the deionized water, the Pluronic F127 and the weak acid have a molar ratio of 1:(0.25-1):(1,000-2,000):(0.01-0.16):(1-16);
   2) Adding the weak acid and the 2-aminoterephthalic acid to the mixed solution obtained in step 1) to obtain a second resulting mixture and stirring the second resulting mixture for 2 h to 4 h to obtain an MOF precursor solution;
   3) Adding the MOF precursor solution obtained in step 2) together with a pretreated carbon felt to a reactor, and sealing the reactor for a hydrothermal reaction; and after the hydrothermal reaction is completed, naturally cooling the reactor to room temperature to obtain a reaction product; and
   4) Performing a washing and a vacuum drying on the reaction product in the reactor to obtain the GF-supported MOF cathode material.

2. The preparation method of the GF-supported MOF cathode material according to claim 1, wherein, in step 3), a pretreatment method for the carbon felt comprises ultrasonic cleaning the carbon felt with acetone or ethanol for 0.5 h to 1 h to obtain a cleaned carbon felt; and washing the cleaned carbon felt with ultrapure water (UPW) until there is no acetone or ethanol residue to obtain the pretreated carbon felt.

3. The preparation method of the GF-supported MOF cathode material according to claim 1, wherein the iron salt is at least one selected from the group consisting of ferric chloride, ferric nitrate, and ferric sulfate.

4. The preparation method of the GF-supported MOF cathode material according to claim 1, wherein the weak acid is at least one selected from the group consisting of acetic acid and formic acid.

5. The preparation method of the GF-supported MOF cathode material according to claim 1, wherein, in step 3), the hydrothermal reaction is conducted at a constant temperature of 100° ° C. to 130° ° C. for 24 h to 48 h.

6. The preparation method of the GF-supported MOF cathode material according to claim 1, wherein, in step 4), the washing is conducted with ultrapure water (UPW) at room temperature for 0.5 h to 1 h and then with ethanol at 50° C. to 70° C. for 0.5 h to 1 h.

7. The preparation method of the GF-supported MOF cathode material according to claim 1, wherein, in step 4), the vacuum drying is conducted at 45° C. to 65° C. for 10 h to 24 h.

* * * * *